United States Patent Office 3,073,742
Patented Jan. 15, 1963

---

3,073,742
STABLE, BACTERIOSTATIC COMPOSITION
Karl Bolz and Helmut Hein, Konstanz, Germany, assignors to Byk-Gulden Lomberg Chemische Fabrik G.m.b.H., Konstanz, Germany, a corporation of Germany
No Drawing. Filed Mar. 31, 1958, Ser. No. 724,894
Claims priority, application Germany Apr. 9, 1957
11 Claims. (Cl. 167—65)

The present invention relates to stable medicinal compositions and more particularly to stable compositions consisting of an aqueous highly viscous solution of tyrothricin and other peptide-like antibiotics, to a process of making such compositions, and to a process of administering the same.

Thyrothricin and other water insoluble peptide-like antibiotics, for instance, gramicidin, tyrocidine, and subtilin, exhibit a low activity on topical application when used without solubilizing agent. This is due to their extremely low solubility in water. Therefore, a number of solubilizing agents have been suggested for dissolving such antibiotics. Polyoxyalkylene derivatives of partial long chain fatty acid esters of a hexitol inner anhydride, quaternary ammonium compounds such as cetyl pyridinium chloride, lauryl chinolinium chloride, cetyl trimethyl ammonium acetate, lauryl trimethyl ammonium bromide, dodecyl-2,4-dimethyl thiazolium chloride and others, non-quaternary salts of long chain aliphatic amines and long chain aliphatic amino carboxylic acids which may contain several imino groups in their chain of carbon atoms, have been used for this purpose. Compared with the quaternary ammonium compounds the last mentioned non-quaternary salts have the advantage of being more stable against the action of proteins and of being substantially non-irritating even on most sensitive mucous membranes.

However, none of the heretofore known and used solubilizing agents allows the preparation of aqueous solutions of tyrothricin and other peptide-like antibiotics of such a high viscosity as it is required when using the solutions in oto-rhinology. Addition of known thickening agents is objectionable for physiological reasons. The use of glycerol as thickening agent causes disagreeable side-effects due to its desiccating action, and is absolutely forbidden after a perforation of the tympanic membranes. Solutions of tyrothricin in oils containing fatty acid amides as solubilizing agents have not proved satisfactory because tyrothricin is absorbed from such solutions with difficulty only.

Although it is possible to produce stable aqueous solutions of tyrothricin and other peptide-like antibiotics by means of urea, a number of lower fatty acid amides, and dicarboxylic acid diamides or, respectively, imides as solubilizing agents, none of these solutions possesses noteworthy advantages over the above mentioned solutions. More in particular, they do not have the required high viscosity which is esesntial for their use in otorhinology.

It is one object of the present invention to provide stable aqueous highly viscous solutions of tyrothricin and other peptide-like antibiotics of low solubility in water.

Another object of the present invention is to provide a simple and efficient process of producing such highly viscous solutions of tyrothricin and other peptide-like antibiotics.

Still another object of the present invention is to provide a method of treating infectious diseases by topically administering such highly viscous solutions containing tyrothricin or other peptide-like antibiotics in predetermined dosages.

Other objects of the present invention and advantageous features thereof will become apparent as the description proceeds.

In principle, aqueous solutions of tyrothricin and other peptide-like antibiotics according to the present invention are prepared by using pyrrolidone as solubilizing agent.

The solubilizing effect of pyrrolidone on tyrothricin and the like antibiotics is quite surprising since heterocyclic compounds, in general, have been found to be unsuitable as solubilizing agents for such water insoluble antibiotics. In order to produce the therapeutically useful, highly viscous, stable, aqueous solutions the antibiotic is preferably first dissolved in alcohol. The solubilizing agent is then added either before dilution of the alcoholic solution with water or it is added together with the diluting water. By varying the amount of solubilizing agent, it is possible to prepare solutions of different viscosity and even highly viscous solutions. Such highly viscous solutions are very suitable for the use in otorhinology.

By the use of pyrrolidone according to the present invention, solutions containing up to 0.5% of the antibiotic compound can readily be prepared. In most cases, however, a concentration higher than 0.25% of the antibiotic is not required for therapeutical purposes. 0.5% of pyrrolidone are sufficient to dissolve the above indicated amount of tyrothricin. Such solutions remain clear and stable even on prolonged storage for 18 months. The antibacterial activity of such solutions is not affected by any variation in viscosity.

Other antibiotics, like bacitracin and neomycin, or other antibacterial substances, for instance, 5-nitro-2-furaldehyde semicarbazone, or vasoconstrictor compounds, such as ephedrine, adrenaline, synephrine tartrate and the like, may be added to solutions according to the present invention without affecting and diminishing their stability and/or viscosity.

Solutions according to the present invention are of general usefulness in the treatment of wound infections. Solutions of tyrothricin and other peptide-like antibiotics of sufficiently high viscosity are particularly useful in the treatment of diseases of the lateral nasal cavities, of the frontal sinus, of the maxillary sinus, and of the auditory canal and have successfully been applied, for instance, in rhinitis, sinusitis, otitis externa, otitis media, mastoiditis, and the like inflammatory diseases.

The following examples serve to illustrate the present invention without, however, limiting the same thereto.

*Example 1*

250 mg. of tyrothricin and 0.5 g. of pyrrolidone are dissolved in 2.5 cc. of alcohol with gentle heating. The resulting solution is filled up to 100 cc. with distilled water.

*Example 2*

200 mg. of subtilin and 1 g. of pyrrolidone are dissolved in 2.5 cc. of alcohol with gentle heating. The solution is filled up to 100 cc. with distilled water.

When using, in place of tyrothricin and subtilin, equal amounts of tyrocidine or other substantially water insoluble peptide-like antibiotics and otherwise proceeding as described in the preceding examples, stable, clear, aqueous solutions of said tyrocidine or other antibiotic are obtained.

As stated hereinabove, addition of alcohol is of advantage to cause rapid dissolving of tyrothricin and the like antibiotics. Usually an addition of about 0.3% of ethanol is sufficient to rapidly produce an 0.25% tyrothricin solution. An amount of 3% of ethanol should preferably not be exceeded since solutions containing more ethanol are not suitable for the treatment of infected and inflamed body cavities. The preferred ethanol concentration which permits the preparation of stable tyrothricin and the like solution in a very short period of time, is about 2%.

The new tyrothricin and the like solutions according to the present invention can be used in the form of nose drops, ear drops, eye washes, mouth washes, or wet dressings. They may also be incorporated into suitable ointment and suppository bases or jellies. It is also possible to apply them in the form of sprays or by irrigation and by instillation into the body cavities not connected directly with the blood stream.

It is, of course, also possible to produce stable, clear, aqueous solutions of tyrothricin and other like antibiotics without the addition of alcohol. However, considerably more time is required to completely dissolve the antibiotic in water and care must be taken that the sterility of the resulting solution is not impaired by prolonged stirring or shaking.

We claim:

1. A stable bacteriostatic composition comprising an aqueous liquid medium tolerated by the human body, pyrrolidone as solubilizing agent, and a substantially water insoluble peptide-like antibiotic, said antibiotic being dissolved in said aqueous liquid medium and forming a clear, stable solution therein.

2. A stable bacteriostatic composition essentially consisting of water, pyrrolidone as solubilizing agent, and a substantially water insoluble peptide-like antibiotic, said antibiotic being dissolved in said water and forming a clear, stable solution therein.

3. A stable bacteriostatic composition comprising an aqueous liquid medium tolerated by the human body, pyrrolidone as solubilizing agent, and a substantially water insoluble peptide-like antibiotic selected from the group consisting of tyrothricin, tyrocidin, and subtilin, said antibiotic being dissolved in said aqueous liquid medium and forming a clear, stable solution therein.

4. A stable bacteriostatic composition comprising an aqueous liquid medium tolerated by the human body, pyrrolidone as solubilizing agent, and a substantially water insoluble peptide-like antibiotic, said antibiotic being dissolved in said aqueous liquid medium and forming a clear, stable solution therein, said solubilizing agent being present in said solution in an amount between about 0.5% and about 10.0% and said antibiotic being present therein in an amount between about 0.1% and about 0.5%.

5. A stable bacteriostatic composition comprising water, pyrrolidone as solubilizing agent, and a substantially water insoluble peptide-like antibiotic selected from the group consisting of tyrothricin, tyrocidin, and subtilin, said antibiotic being dissolved in said water and forming a clear, stable solution therein, said solubilizing agent being present in said solution in an amount between about 0.5% and about 10.0% and said antibiotic being present therein in an amount between about 0.1% and about 0.5%.

6. A stable bacteriostatic composition consisting of a clear essentially aqueous solution comprising a substantially water insoluble peptide-like antibiotic in a concentration greater than its solubility in water and pyrrolidone as solubilizing agent.

7. A stable bacteriostatic composition consisting of a clear essentially aqueous solution comprising a substantially water insoluble peptide-like antibiotic in a concentration greater than its solubility in water, said antibiotic being selected from the group consisting of tyrothricin, tyrocidin, and subtilin, and pyrrolidone as solubilizing agent.

8. A bacteriostatic composition consisting of a stable, essentially aqueous, clear solution containing about 0.25% of tyrothricin, about 0.5% of pyrrolidone, and about 2.5% of alcohol.

9. A bacteriostatic composition consisting of a stable, essentially aqueous, clear solution containing about 0.2% of subtilin, about 1.0% of pyrrolidone, and about 2.5% of alcohol.

10. In the process of producing a bacteriostatic composition, the steps which comprise dissolving a substantially water insoluble peptide-like antibiotic in alcohol and diluting the alcoholic solution with distilled water with the addition of pyrrolidone in an amount not substantially exceeding 10% by weight of the resulting stable, clear, aqueous solution.

11. In the process of producing a bacteriostatic composition, the steps which comprise dissolving a substantially water-insoluble peptide-like antibiotic selected from the group consisting of tyrothricin, tyrocidine, and subtilin, and diluting the alcoholic solution with distilled water with the addition of pyrrolidone in an amount not substantially exceeding 10% by weight of the resulting stable, clear, aqueous solution.

References Cited in the file of this patent

UNITED STATES PATENTS

| | | |
|---|---|---|
| 2,658,045 | Schildknecht | Nov. 3, 1953 |
| 2,791,531 | Bellard | May 7, 1957 |
| 2,897,120 | Cronin et al. | July 28, 1959 |

FOREIGN PATENTS

| | | |
|---|---|---|
| 507,692 | Belgium | June 9, 1952 |
| 759,577 | Great Britain | Oct. 17, 1956 |
| 784,659 | Great Britain | Oct. 16, 1957 |
| 794,482 | Great Britain | May 7, 1958 |
| 945,863 | Germany | July 19, 1956 |

OTHER REFERENCES

Drug Trade News, May 10, 1954, page 81.

Montmorency: Antibiotics & Chemotherapy, vol. 4, No. 3, March 1954, pages 313–318.

"Polyvinylpyrrolidon," by Reppe, Verlag Chemie, Weinheim, 1954, page 18.